(12) United States Patent
Rice et al.

(10) Patent No.: US 12,209,774 B2
(45) Date of Patent: Jan. 28, 2025

(54) WATER HEATER

(71) Applicant: Bradford White Corporation, Ambler, PA (US)

(72) Inventors: Ryan Patrick Rice, Milwaukee, WI (US); John Ferdinand Bopp, West Bend, WI (US); John Walter Lesniak, II, Brookfield, WI (US); Anthony Collin Schaeve, Milwaukee, WI (US)

(73) Assignee: Bradford White Corporation, Ambler, PA (US)

( * ) Notice: Subject to any disclaimer, the term of this patent is extended or adjusted under 35 U.S.C. 154(b) by 716 days.

(21) Appl. No.: 17/038,087

(22) Filed: Sep. 30, 2020

(65) Prior Publication Data

US 2022/0099338 A1 Mar. 31, 2022

(51) Int. Cl.
| | |
|---|---|
| *F24H 9/20* | (2022.01) |
| *F24D 19/08* | (2006.01) |
| *G05B 13/02* | (2006.01) |
| *H05B 3/82* | (2006.01) |
| *G06F 3/04847* | (2022.01) |

(52) U.S. Cl.
CPC ......... *F24H 9/2028* (2013.01); *F24D 19/088* (2013.01); *G05B 13/02* (2013.01); *H05B 3/82* (2013.01); *F24D 2220/042* (2013.01); *F24D 2220/044* (2013.01); *F24D 2220/046* (2013.01); *G06F 3/04847* (2013.01); *H05B 2203/035* (2013.01)

(58) Field of Classification Search
CPC .... F24H 9/2007; F24H 9/2028; F24H 15/144; F24H 15/148; F24H 15/152; F24H 15/215; F24H 15/219; F24H 15/225; F24D 19/088; F24D 2220/042; F24D 2220/044; F24D 2220/046; G05B 13/02; H05B 3/82; H05B 2203/035; G06F 3/04847

See application file for complete search history.

(56) References Cited

U.S. PATENT DOCUMENTS

| | | | |
|---|---|---|---|
| 4,604,515 A | 8/1986 | Davidson | |
| 4,970,373 A | 11/1990 | Lutz et al. | |
| 5,216,743 A | 6/1993 | Seitz | |
| 5,504,306 A | 4/1996 | Russell et al. | |
| 5,838,879 A | 11/1998 | Harris | |
| 5,866,880 A | 2/1999 | Seitz | |

(Continued)

*Primary Examiner* — Justin C Dodson
(74) *Attorney, Agent, or Firm* — Buchanan Ingersoll & Rooney PC

(57) ABSTRACT

A water heater including a cabinet having an inlet, an outlet, and a flow path disposed between the inlet and the outlet and having a plurality of upper and lower junctions to redirect the flow path. Each lower junction includes a drain port. A flow rate sensor measures the flow rate of the fluid through the flow path, an inlet temperature sensor measures an inlet temperature, an and outlet temperature sensor measures the outlet temperature. Heating elements are disposed along the flow path between the inlet and outlet temperature sensors, and intermediate temperature sensors are disposed adjacent respective heating elements to measure an intermediate temperature within the flow path. A controller operates the heating elements to heat a fluid within the flow path to a predetermined set point temperature based on the measurements of the flow rate sensor and temperature sensors.

19 Claims, 11 Drawing Sheets

(56) References Cited

U.S. PATENT DOCUMENTS

| | | |
|---|---|---|
| 6,080,971 A | 6/2000 | Seitz |
| 6,080,973 A | 6/2000 | Thweatt, Jr. |
| 6,130,990 A | 10/2000 | Herrick et al. |
| 6,175,689 B1 | 1/2001 | Blanco, Jr. |
| 6,239,512 B1 | 5/2001 | Henderson et al. |
| 6,240,249 B1 | 5/2001 | Henderson et al. |
| 6,240,250 B1 | 5/2001 | Blanco, Jr. |
| 6,246,831 B1 | 6/2001 | Seitz |
| 6,376,816 B2 | 4/2002 | Cooper |
| 6,424,801 B1 | 7/2002 | Rabadi |
| 6,516,142 B2 | 2/2003 | Grant et al. |
| 6,522,834 B1 | 2/2003 | Herrick et al. |
| 6,539,171 B2 | 3/2003 | Vonarx et al. |
| 6,574,426 B1 | 6/2003 | Byron, Jr. |
| 6,577,817 B2 | 6/2003 | Harris |
| 6,694,093 B2 | 2/2004 | Morris et al. |
| 6,740,857 B1 | 5/2004 | Furlong et al. |
| 6,744,978 B2 | 6/2004 | Tweedy et al. |
| 6,909,843 B1 | 6/2005 | Fabrizio |
| 7,007,316 B2 | 3/2006 | Chiang |
| 7,050,706 B2 | 5/2006 | Israelson et al. |
| 7,088,915 B1 | 8/2006 | Sturm et al. |
| 7,158,718 B2 | 1/2007 | Russegger |
| 7,190,886 B2 | 3/2007 | Dubicki, Jr. et al. |
| 7,206,506 B2 | 4/2007 | Sturm |
| 7,243,381 B2 | 7/2007 | Lutz, II |
| 7,567,750 B2 | 7/2009 | Yang |
| 7,567,751 B2 | 7/2009 | Fabrizio |
| 7,570,877 B1 | 8/2009 | Huang |
| 7,616,873 B1 | 11/2009 | Seitz |
| D607,418 S | 1/2010 | Kleman et al. |
| 7,657,950 B2 | 2/2010 | Robert et al. |
| 7,779,790 B2 | 8/2010 | Fabrizio |
| 7,817,906 B2 | 10/2010 | Callahan et al. |
| 7,945,146 B2 | 5/2011 | Cabrera |
| 8,001,628 B2 | 8/2011 | Eveleigh et al. |
| 8,064,758 B2 | 11/2011 | Fabrizio |
| D653,321 S | 1/2012 | Watanabe et al. |
| 8,104,434 B2 | 1/2012 | Fabrizio |
| 8,107,802 B2 | 1/2012 | Hollis |
| 8,150,246 B1 | 4/2012 | Bolivar |
| 8,165,461 B2 | 4/2012 | Sullivan |
| D662,195 S | 6/2012 | Watanabe et al. |
| 8,209,796 B2 | 7/2012 | Eveleigh et al. |
| 8,243,040 B2 | 8/2012 | Koottungal |
| 8,280,236 B2 | 10/2012 | Fabrizio |
| 8,297,525 B1 | 10/2012 | Bolivar |
| 8,366,014 B2 | 2/2013 | Ene et al. |
| 8,396,356 B2 | 3/2013 | Perry et al. |
| 8,577,211 B2 | 11/2013 | Lucker et al. |
| 8,595,869 B2 | 12/2013 | Eveleigh et al. |
| 8,626,347 B2 | 1/2014 | Watson et al. |
| D703,156 S | 4/2014 | Parsons et al. |
| D703,157 S | 4/2014 | Parsons et al. |
| 8,731,386 B2 | 5/2014 | Waechter et al. |
| 8,787,742 B2 | 7/2014 | Lutz et al. |
| 8,861,943 B2 | 10/2014 | Bowers et al. |
| 9,040,880 B2 | 5/2015 | Potter et al. |
| 9,074,819 B2 | 7/2015 | Tiras et al. |
| 9,140,466 B2 | 9/2015 | Jurczyszak et al. |
| 9,167,630 B2 | 10/2015 | Seitz |
| 9,220,658 B2 | 12/2015 | Eveleigh et al. |
| 9,234,674 B2 | 1/2016 | Hayden et al. |
| 9,498,405 B2 | 11/2016 | Eveleigh et al. |
| 9,702,585 B2 | 7/2017 | Hayden et al. |
| 9,857,096 B2 | 1/2018 | Mihu et al. |
| 9,874,373 B2 | 1/2018 | Seitz |
| 10,024,571 B2 | 7/2018 | Seitz |
| 10,203,131 B2 | 2/2019 | Mihu et al. |
| 10,441,504 B2 | 10/2019 | Eveleigh et al. |
| 2006/0222349 A1* | 10/2006 | Sturm .................. F24H 15/156 |
| | | 392/463 |
| 2008/0273868 A1* | 11/2008 | Boussemart .......... F24H 15/238 |
| | | 392/458 |
| 2009/0143880 A1* | 6/2009 | Amundson ........ G05D 23/1902 |
| | | 700/83 |
| 2009/0285569 A1 | 11/2009 | Fabrizio |
| 2010/0074602 A1 | 3/2010 | Israelsohn et al. |
| 2011/0013893 A1 | 1/2011 | Fabrizio |
| 2011/0236004 A1 | 9/2011 | Bowers et al. |
| 2011/0282499 A1* | 11/2011 | Sowani ................ F24H 15/355 |
| | | 700/282 |
| 2014/0023352 A1* | 1/2014 | Jurczyszak ............. F24H 15/32 |
| | | 392/465 |
| 2014/0023354 A1* | 1/2014 | Hankins ................ F24H 9/2028 |
| | | 392/480 |
| 2014/0178057 A1 | 6/2014 | Hayden et al. |
| 2015/0168010 A1 | 6/2015 | Jansen et al. |
| 2015/0345830 A1 | 12/2015 | Jurczyszak et al. |
| 2016/0216007 A1* | 7/2016 | Harbin, III ............ F24H 9/2014 |
| 2017/0258680 A1 | 9/2017 | Eveleigh et al. |
| 2017/0268800 A1 | 9/2017 | Hayden et al. |
| 2019/0145634 A1* | 5/2019 | Chaudhry ............... F24H 1/202 |
| | | 392/308 |
| 2020/0217560 A1* | 7/2020 | Zeitz .................... F24H 9/2028 |
| 2021/0071402 A1* | 3/2021 | Lee ...................... H05B 1/0283 |

* cited by examiner

Model
S/N:                    120
FW Ver:
Mfg Site: P11
Mfg Date:

FIG. 13

Current Sensors                 122

| BANK1 | BANK2 | BANK3 | BANK4 |

FIG. 14

WATER HEATER

BACKGROUND OF THE INVENTION

1. Field of the Invention

The present invention relates to a water heater. The water heater includes a controller configured to efficiently use the heating elements therein to align an outlet temperature with a predetermined set point temperature by using a number of data inputs.

2. Discussion of the Related Art

Tankless water heaters provide an advantage over traditional tank water heaters by only applying energy to heat water as it travels through the water heater as opposed to having to maintain water within a reservoir at a specific temperature. As a result, a tankless water heater must take into account a number of data items that need not be considered by a tank water heater. For instance, a tankless water heater must take into account input water temperature and water flow rate as it travels through the tankless water heater. Further, a common issue with traditional tankless water heaters are sudden changes in temperature at the outlet of the tankless water heater as a result of change in demand from the tankless water heater.

There is a need in the art for a tankless water heater that efficiently uses the heating elements of the tankless water heater in order to efficiently heat the water as it flows through the flow path of the water heater. Further, there is a need in the art for a tankless water heater including a number of safety features that prevent overheating of the water within the water heater and the electrical elements within the water heater itself.

SUMMARY OF THE INVENTION

The present invention is a water heater such as, but not limited to a tankless water heater. According to an embodiment of the invention, the water heater includes a cabinet having an inlet and an outlet and a flow path fluidically coupling the inlet and the outlet. The flow path has a plurality of upper and lower junctions to redirect the flow path. Further, at least one of the lower junctions includes a drain port.

At least one flow rate sensor is disposed along the flow path to measure the flow rate of the fluid through the flow path. At least one inlet temperature sensor is disposed along the flow path adjacent the inlet to measure an inlet temperature. Similarly, at least one outlet temperature sensor is disposed along the flow path adjacent the outlet to measure an outlet temperature. The water heater further includes at least one heating element disposed within the flow path between the inlet and outlet temperature sensors. In turn, at least one intermediate temperature sensor is disposed adjacent a respective heating element to measure an intermediate temperature within the flow path.

The water heater further includes a controller configured to operate the at least one heating element to heat a fluid within the flow path to a predetermined set point temperature. In one instance, the controller is configured to enable at least one heating element when the at least one flow rate sensor measures a flow rate greater than a predetermined activation flow rate and disable the at least one heating element when the at least one of flow sensor measure a flow rate less than a predetermined deactivation flow rate. The water heater also includes a user interface having a screen to display information to a user. In turn, the user interface is configured to allow the user to adjust the predetermined activation flow rate and the predetermined deactivation flow rate. Similarly, the user interface is configured to allow the user to adjust the predetermined set point temperature.

In accordance with another aspect of the invention, the controller is configured to detect at least one of a power down condition, a brown out condition, and a remote reset condition. In turn, the controller is configured to communicate the at least one of the power down condition, the brown out condition, and the remote reset condition to the user interface.

In accordance with yet another aspect of the invention, the controller is configured to operate the at least one heating element based on the inlet temperature, the outlet temperature, and the intermediate temperature. In turn, the controller is configured to communicate the inlet temperature, the outlet temperature, and the intermediate temperature to the user interface. Further yet, the controller is configured to detect whether the cabinet door is in a closed position or an open position.

In accordance with another aspect of the invention, the controller is configured to measure an error value between the set point temperature and the outlet temperature. In turn, the controller is configured to operate the at least one heating element to reduce the error value.

In accordance with yet another aspect of the invention, the water heater includes a pressure sensor disposed within the cabinet to measure a cabinet pressure within the cabinet. The controller is configured to disable the at least one heating element when the cabinet pressure is below a predetermined pressure deactivation threshold and allow activation of the least one heating element when the cabinet pressure is above a predetermined pressure activation threshold. In turn, the controller is configured to communicate the cabinet pressure to the user interface. Further yet, the user interface is configured to allow the user to adjust the predetermined pressure activation threshold and the predetermined pressure deactivation threshold.

In accordance with another aspect of the invention, the water heater includes a cabinet temperature sensor disposed within the cabinet to measure a cabinet temperature within the cabinet. Further yet, the water heater may include a cabinet heater to maintain an internal cabinet temperature that is operated based on the measured cabinet temperature.

In accordance with yet another embodiment of the invention, the at least one flow rate sensor determines a direction of the fluid within the flow path. A forward flow from the inlet to the outlet is measured as a positive value, while a reverse flow or no flow from the outlet to the inlet is measured as a negative value or a zero value. The controller is configured to disable the at least one heating element when the at least one of flow sensor measure a reverse flow rate or a zero value.

According to another embodiment of the invention, a water heater includes a cabinet having an inlet and an outlet, a flow path fluidically coupling the inlet and the outlet, and at least one flow rate sensor disposed along the flow path. The flow path includes a plurality of upper junctions and lower junctions to direct the flow path. Each lower junction includes a drain port. Further, an inlet temperature sensor is disposed along the flow path adjacent the inlet to measure an inlet temperature and an outlet temperature sensor is disposed along the flow path adjacent the outlet to measure an outlet temperature. At least one heating element is disposed within the flow path between the inlet and outlet temperature sensors, and an intermediate temperature sensor is disposed adjacent each respective heating element to measure an intermediate temperature.

In accordance with another aspect of the invention, the water heater includes a controller configured to operate the at least one heating element to heat a fluid within the flow path to a predetermined set point temperature. The controller enables the heating elements when the at least one flow rate sensor measures a flow rate greater than a predetermined activation flow rate. Conversely, the controller disables the heating elements when the at least one of flow sensor measures a flow rate less than a predetermined deactivation flow rate.

In accordance with yet another aspect of the invention, the water heater includes a user interface configured to allow the user to adjust the predetermined activation flow rate and the predetermined deactivation flow rate. The user interface also includes a display having a plurality of screens to display information to the user. The plurality of screens include a first screen of the plurality of screens displaying at least one of a setpoint temperature, the flow rate, and the outlet temperature, a second screen of the plurality of screens displaying at least one of the inlet temperature, each intermediate temperature, and the outlet temperature, and a third screen of the plurality of screens configured to allow a user to toggle between an operation mode and a test mode. Further yet, the water heater preferably includes a communication interface external of the cabinet 12 and in communication with the controller via of a Modbus communication protocol.

According to yet another embodiment of the invention, a water heater includes a plumbing system, an electrical system, and an enclosure system. The plumbing system includes inlet function, an outlet function, a vessel function, a heating function, a temperature sensor function, and a flow sensor function. The vessel function has a flow path extending from the inlet function to the outlet function. Meanwhile, the heating function has a plurality of heating elements disposed in the flow path. The temperature sensor function has an input temperature sensor, an output temperature sensor, and a plurality of intermediate temperature sensors. Finally, the flow sensor function has a flow sensor disposed between the inlet function and the vessel function. Alternatively, the flow sensor may be disposed within the vessel function or between the outlet function and the vessel function.

The electrical system includes a power input function, a power switch function, a thermal overload function, a contactor function, a control function, and a user interface. The power input function distributes power received from an input power harness to the electrical system. The power switch function has a plurality of solid-state relays that provide power to the heating function. The thermal overload function includes a plurality of thermal switches configured to fault under a thermal overload condition. The contactor function has a plurality of contactors configured to connect the power input function to the power switch function. Meanwhile the control function includes a controller configured to control the contactor function to provide power from the power input function to the heating function by way of the power switch function to heat a fluid within the vessel function based on data received from the temperature sensor function, the flow sensor function, the contactor function, the thermal overload function, and the power input function. The controller is configured to disable operation of the heating function when a measured flow rate received from the flow sensor function is below a predetermined activation flow rate. Conversely, the controller is configured to enable operation of the heating function when a measured flow rate received from the flow sensor function is above a predetermined activation flow rate. In addition, the controller is configured to operate the at least one heating element based on a comparison of an outlet temperature measured by the temperature sensor function to a predetermined set point temperature. Further, the user interface is in communication with the controller and includes a display and input. The display shows data received from at least the temperature sensor function and the flow sensor function, while the input allows a user to adjust the predetermined activation flow rate and the predetermined set point temperature.

Finally, the enclosure system preferably has a back plate and a cover. The back plate is mounted to a surface, while the cover is removably coupled to the back plate to enclose the enclosure system.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIGS. 6-14 depict various display screens of the water heater of FIG. 1;

Figure 1:
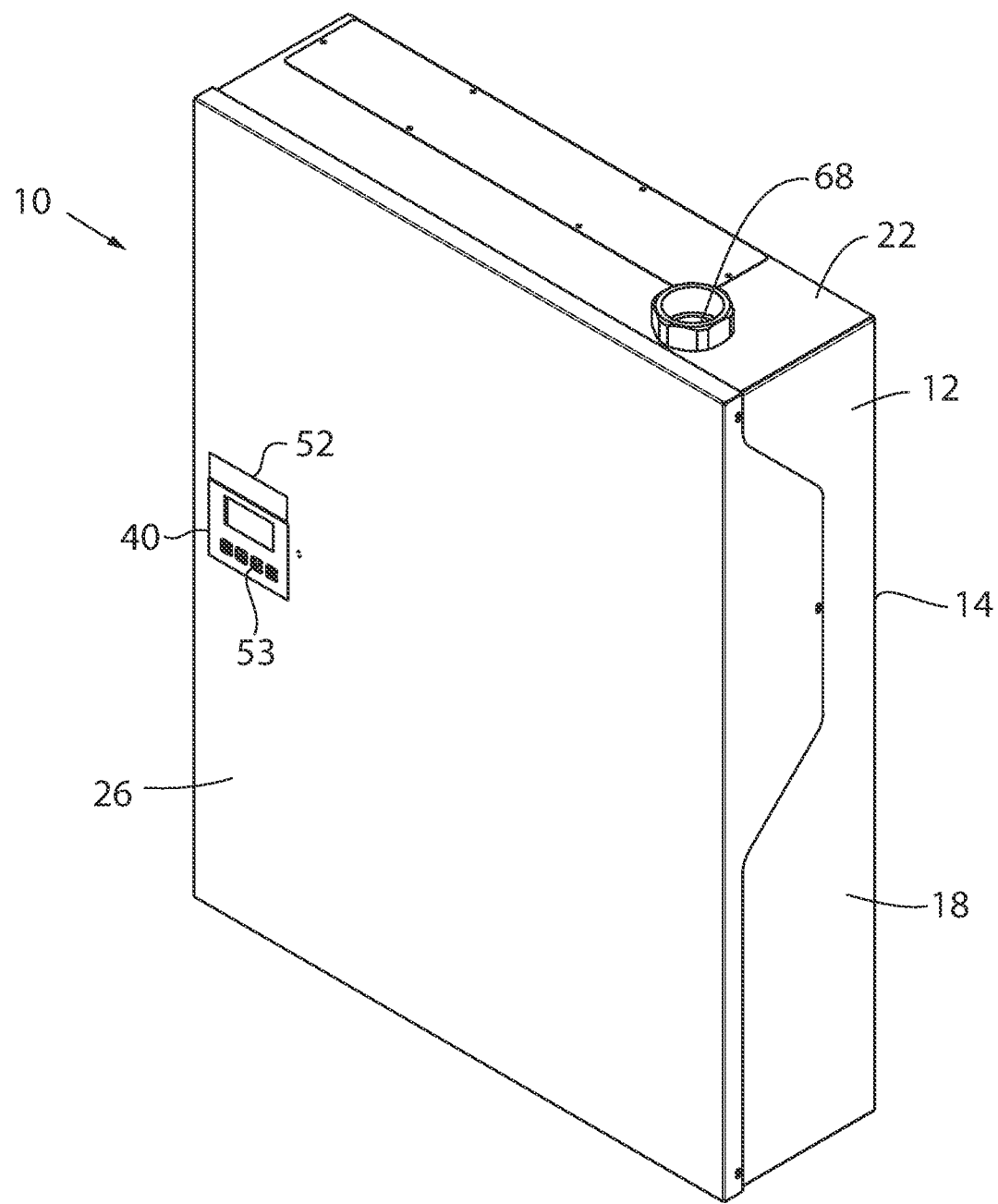
FIG. 1 is a first perspective view of a water heater, according to an embodiment of the invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION OF PREFERRED EMBODIMENTS

The present invention and the various features and advantageous details thereof are explained more fully with reference to the non-limiting embodiments described in detail in the following description.

Figure 2:
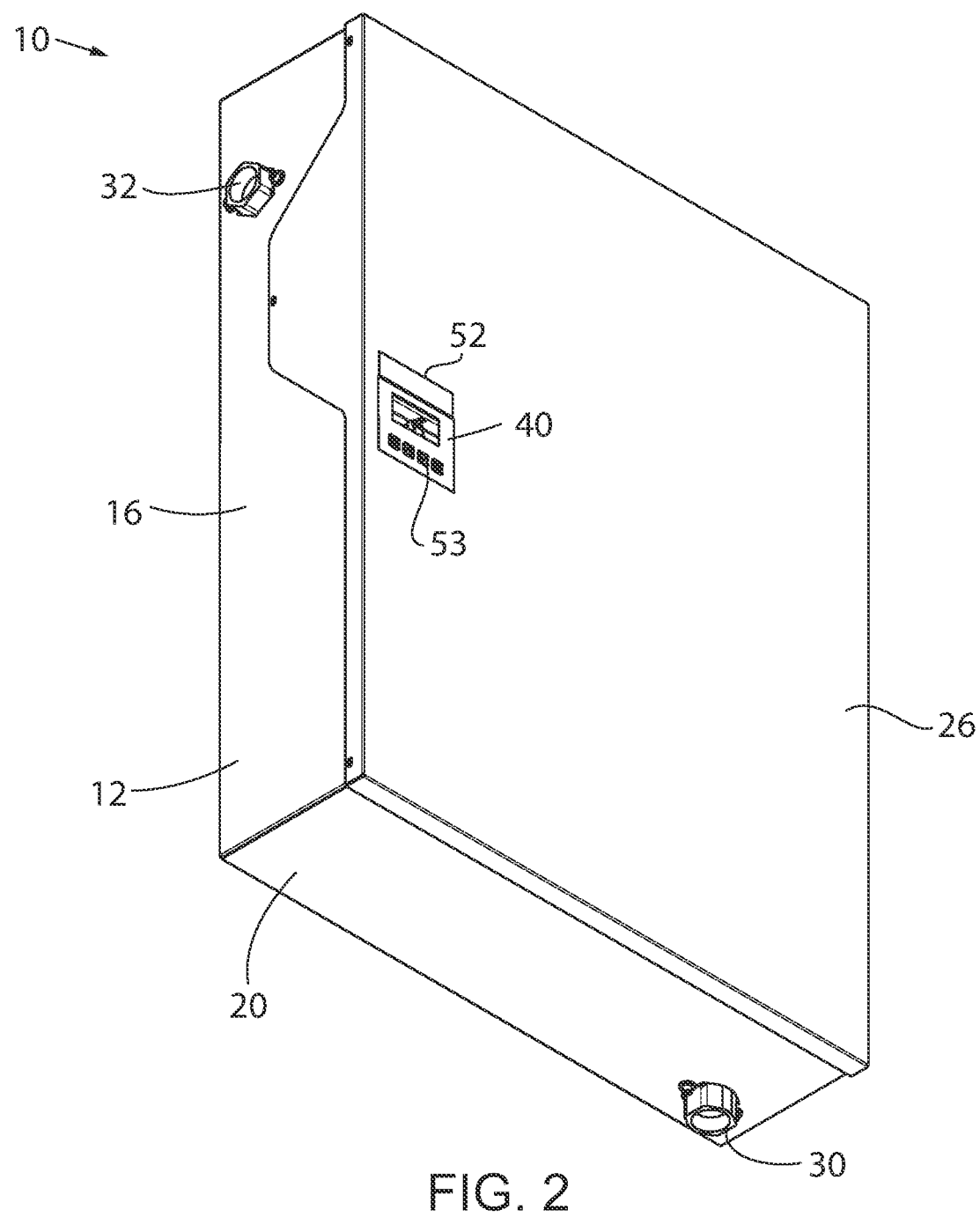
FIG. 2 is a second perspective view of the water heater of FIG. 1.

Referring first to FIGS. 1 and 2, a water heater 10 is shown having a housing or a cabinet 12. The cabinet 12 includes a back plate 14 and a plurality of sidewalls 16, 18, 20, 22 surrounding an interior cavity 24 within the cabinet 12. The back plate 14 is able to be mounted to a wall (not shown) in order to mount the cabinet 12 to the wall. The housing 12 also includes a cover 26 or removable or hinged door 26 configured to allow access to the interior 24 of the cabinet 12.

Figure 3:
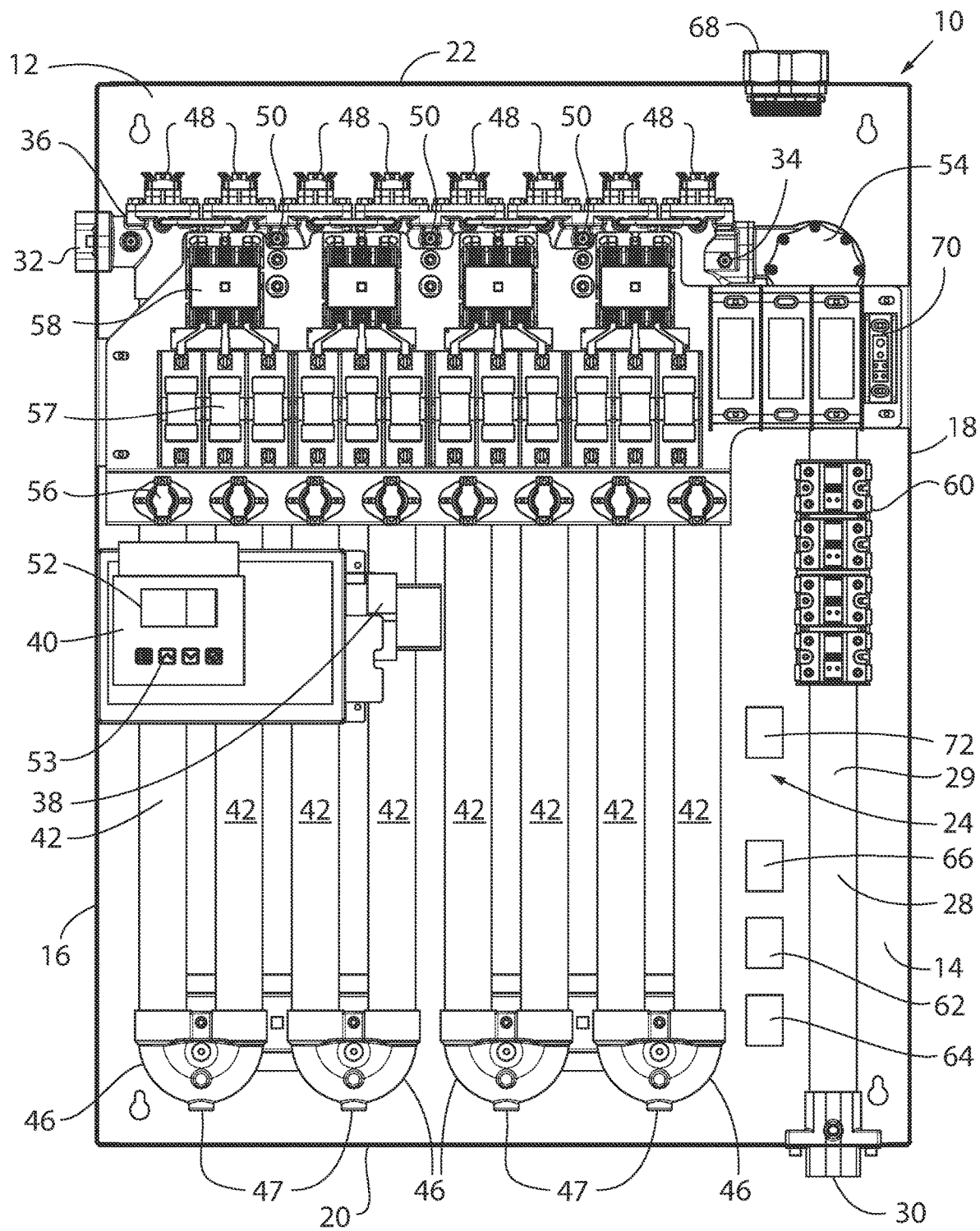
FIG. 3 is an elevation view of an interior of the water heater of FIG. 1.

As shown in FIG. 3, the water heater 10 includes a flow path 28 that extends from an inlet 30 of the cabinet 12 to an outlet 32 of the cabinet 12. In the representative embodiment of the invention, the inlet 30 is disposed in the bottom sidewall 20 of the cabinet 12 and the outlet 32 is disposed in the left sidewall 16 of the cabinet 12. In varying embodiments of the invention, the inlet 30 and the outlet 32 may be disposed in any of the sidewalls 16, 18, 20, 22 of the cabinet 12.

The controller 38 is further in communication with a user interface 40. In the representative embodiment of the invention, the user interface 40 is disposed within the cabinet 12 and visible through the cover 26, when the cover 26 is closed. Further yet, it is contemplated that the controller may detect whether the cover 26 is open/removed or closed. Additional capabilities of the user interface 40 will be described later and in further detail. In other embodiments of the invention, the controller 38 may also be in communication with a communication interface 41 exterior to the cabinet 12 by way of a Modbus communication protocol.

Figure 4:
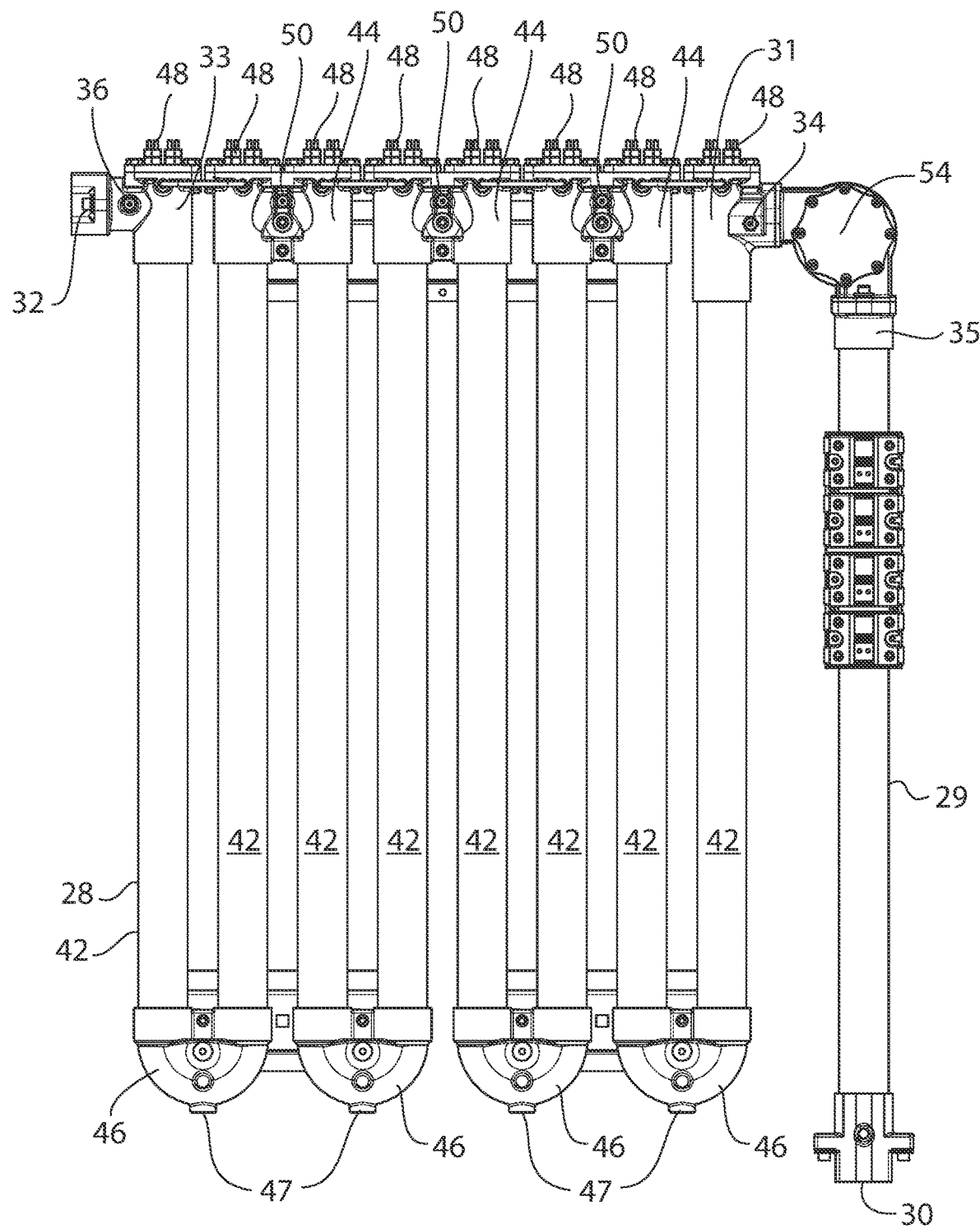
FIG. 4 is an elevation view of a flow path of the water heater of FIG. 1.

In the representative embodiment of the invention, the fluid or flow path 28 extends from the inlet 30 to the outlet 32 by way of a number of vertically oriented channels 42 connected sequentially by way of a number of upper junctions 44 and lower junctions 46 configured to navigate the flow path 28 through the interior 24 of the cabinet 12. The inlet 30 is connected to the first channel 42 by way of an inlet channel 29 and an inlet junction 31. As shown in FIG. 4, the inlet channel 29 extends from the inlet 30 to the inlet junction 31. The inlet junction 31 then transitions the flow path 28 to the first channel 42 to direct water through the water heater 10. Similarly, the outlet 32 is connected to the last channel 42 by way of an outlet junction 33. As shown in FIG. 4, the outlet junction 33 transitions the flow path 28 from the last channel 42 to the outlet 32. In other embodiments of the invention, it is contemplated that an outlet channel may be disposed between the outlet junction 33 and the outlet 32.

As shown in FIGS. 3 and 4, each lower junction 46 may include a drain port 47 configured to assist in draining the fluid from the flow path 28 of the water heater 10, if necessary. In the representative embodiment of the invention, each drain port 47 is configured to drain the two channels 42 that are connected to the specific lower junction 46 having that drain port 47. By disposing a drain port 47 in each lower junction 46, every channel 42 is able to be drained via gravity.

The water heater 10 further includes a number of heating elements 48 that are disposed in one or more respective channels 42 of the flow path 28. In the representative embodiment of the invention, the heating element 48 is disposed in each channel 42. However, it is contemplated that varying embodiments of the invention may dispose any number of heating elements 48 including zero in each channel 42.

An inlet temperature sensor 34 is disposed within the cabinet 12 and along the flow path 28 at a location between the inlet 30 and the heating elements 48 to measure an inlet temperature of the water heater 10. In varying embodiments of the invention, the inlet temperature sensor 34 may be disposed at a location adjacent the inlet 30, adjacent a flow meter 54, or any other location before the first heating element 48. Similarly, an outlet temperature sensor 36 is disposed within the cabinet 12 and along the flow path 28 at a location between the outlet 32 and the heating elements 48 to measure an outlet temperature. In the representative embodiment of the invention, the outlet temperature sensor 36 is disposed adjacent the outlet 32. In different embodiments of the invention, the outlet temperature sensor 36 may be disposed at any location between the outlet 32 and the final heating element 48. The water heater 10 includes a controller 38 in communication with the inlet temperature sensor 34 and the outlet temperature sensor 36 so as to receive the measured inlet and outlet temperatures, respectively.

The water heater 10 also includes a number of intermediate temperature sensors 50 disposed at one or more of the upper junctions 44 of the flow path 28. While the representative embodiment of the invention depicts an intermediate temperature sensor 50 at each upper junction 44, it is contemplated that varying embodiments of the invention may include any number of temperature sensors 50 including zero disposed at each upper junction 44. In an alternative embodiment of the invention, any number of temperature sensors 50 could also be disposed at each lower junction 46. Further yet, other embodiments of the invention could include any number of temperature sensors 50 disposed at various locations along the flow path 28. Each intermediate temperature sensor 50 measures an intermediate temperature of the fluid within the flow path 28 at a location between adjacent heating elements 48. In turn, the controller 38 is in communication with each intermediate temperature sensor 50 to measure the intermediate temperature at various locations along the flow path 28. As stated above, the representative embodiment of the invention includes an intermediate temperature 50 between each heating element 48.

Via communication with the controller 38, the user interface 40 is able to show the measured inlet, outlet, and intermediate temperatures to the user via a display 52, such as, but not limited to a liquid crystal display (LCD). The controller 38 is also able to provide the measured inlet, outlet, and intermediate temperatures to the communication interface 41. The controller 38 is configured to operate the heating elements 48 based on one or more of the measured inlet, outlet, and intermediate temperatures throughout the flow path 28 in order to bring the outlet temperature to a predetermined set point water temperature. The display 52 of the user interface 40 and the communication interface 41 are also able to display the predetermined set point water temperature to a user and allow the user to adjust the predetermined set point water temperature. In embodiments of the invention in which the water heater 10 used in conjunction with a safety application, such as, but not limited to an eye wash or shower application, the predetermined set point water temperature may be set at a certain value, such as 80° F. (26.7° C.), that is not adjustable by the user.

The water heater 10 further includes a flow rate sensor 54 disposed along the flow path 28 to measure the flow rate of the fluid within the flow path 28. In the representative embodiment of the invention, the flow rate sensor 54 is disposed at a location between the inlet 30 and the first channel 42. More specifically, the flow rate sensor 54 is disposed between the inlet channel 29 and the inlet junction 31. In the representative embodiment of the invention, the flow rate sensor 54 may be coupled to the inlet channel 29 via a junction 35. In varying embodiments of the invention, the flow rate sensor 54 may be disposed at any location along the flow path 28 between the inlet 30 and outlet 32 of the cabinet 12.

In turn, the controller 38 is in communication with the flow rate sensor 54 so as to receive the measured flow rate. The controller 38 is able to use the measurements of the flow rate sensor 54 to determine the direction of the fluid flowing through the flow path 28. When the fluid is flowing from the inlet 30 to the outlet 32, the controller 38 determines the fluid is moving in a forward flow. Conversely, when the fluid is still or flowing from the outlet 32 to the inlet 30, the controller 38 determines the flow fluid of the fluid to be zero. In other embodiments of the invention, when the fluid is flowing from the outlet 32 to the inlet 30, the controller 38 may be able to determine the fluid is moving in a reverse flow.

In the representative embodiment of the invention, the controller 38 is configured to enable or disable operation of the one or more heating elements 48 based upon the measured flow rate. For instance, the controller 38 would enable operation of the heating elements 48 if the measured flow rate is greater than a predetermined activation flow rate. Conversely, the controller 38 would disable operation of the heating elements 48 if the measured flow rate was less than a predetermined deactivation flow rate. Additionally, the controller 38 would disable operation of the heating elements 48 if the measured flow rate was determined to be a zero flow or a reverse flow.

As stated above, the controller 38 is also in communication with the user interface 40. The display 52 of the user interface 40 is able to show the user the measured flow rate of the fluid within the flow path 28. In the preferred embodiment of the invention, the forward flow is depicted with a positive value, while the reverse flow is depicted with a negative value.

The heating elements 48 discussed above are monitored by the controller 38 so that the controller 38 may determine the current of each heating element 48. In the preferred embodiment of the invention, the controller 38 may compute the current of each heating element 48 in Amperes, root mean squared ($A_{rms}$). As the controller 38 is in communication with the user interface 40 and the communication interface 41, the controller 38 is able to communicate the current of each heating element 48 to the user interface 40 and its display 52 and the communication interface 41. As a result, a user is able to read the current of each heating element 48 on the display 52.

As shown in FIG. 3, the water heater 10 may include one or more of a bimetal thermal switch 56, fuse 57, contactor 58, and solid-state relay 60 electrically coupled to each other and disposed within the cabinet 12. In the representative embodiment of the invention, the bimetal thermal switches are shown as a bank of bimetal thermal switches 56 disposed in each of the channels 42 of the flow path 28. In other embodiments of the invention, a bank of bimetal thermal switches 56 may be disposed in any number of channels 42 of the flow path. Further, the representative embodiment of the invention, shows the fuses 57 in groups of fuse banks. The purposes of these features are described below.

The controller 38 is able to monitor the state of the banks of bimetal thermal switches 56. Further, the controller 38 is configured to enable or disable operation of the contactors 58 and the heating elements 48 based on the state of the bimetal thermal switch 56. For instance, when any of the banks of bimetal thermal switches 56 opens, the current to the respective contactor 58 is interrupted and the circuit is open. If the controller 38 detects that any of the banks of bimetal thermal switches 56 are open as a result of at least one of the bimetal thermal switches within the bank 56 being in a fault condition, the controller 38 is able to report the open circuit and fault condition to the user interface 40 and communication interface 41. In turn, the controller 38 shuts down the remaining contactors 58 to disable all the heating elements 48. Conversely, if the controller 38 detects that the banks of bimetal thermal switches 56 are closed as a result of none of the bimetal thermal switches within the banks 56 being in a fault condition, the controller 38 enables the heating elements 48. As the controller 38 is in communication with the user interface 40, the controller 38 is able to communicate the status of each bank of bimetal thermal switch 56 to the user interface 40 and its display 52.

The controller 38 is able to individually engage and disengage each contactor 58 when the bimetal thermal switches 56 are in a closed state and not a fault condition. That is, when a thermal overload or fault condition is detected, the bimetal thermal switches 56 are automatically tripped and put in an open state. When the bimetal thermal switches 56 are in the open state, the contactors 58 are automatically disengaged so as to remove power from the heating elements 48. The controller 38 further monitors the status of each contactor 58 and bank of fuses 57 and reports the status of each contactor 58 and bank of fuses 57 to the user interface 40 and the communication interface 41.

As stated above, the controller 38 disengages the contactors 58 when a fault condition is detected. Further, the controller 38 does not allow the contactors 58 to reengage until each fault condition has been removed and acknowledged by the user/operator at the user interface 40 or the communication interface 41.

To extend operating life of the contactors 58, the controller 38 does not change the state of the contactors 58 while current is flowing through it. That is, the contactors 58 are engaged and disengaged when the solid-state relays 60 are off to prevent current from flowing through the contactors 58 when the contactors 58 are being engaged or disengaged.

The water heater 10 may also include a cabinet temperature sensor 62 disposed within the cabinet 12 and configured to measure the temperature of the interior 24 of the cabinet 12 of the water heater 10. The controller 38 is in communication with the cabinet temperature sensor 62 and receives the measured cabinet temperature from the cabinet temperature sensor 62. Via communication with the controller 38, the user interface 40 is able to show the measured cabinet temperature to the user via a display 52. The controller 38 may also provide the measured cabinet temperature to the communication interface 41.

In certain embodiments of the invention, a cabinet heater 64 may be disposed within the interior 24 of the cabinet 12. In such embodiments, the controller 38 may activate or deactivate the cabinet heater 64 based on the measured cabinet temperature. For example, the controller 38 may be configured to activate the cabinet heater 64 when the measured cabinet temperature is below a predetermined activation temperature, such as, but not limited, to 40° F. Conversely, the controller 38 may be configured to deactivate the cabinet heater 64 when the measured cabinet temperatures is above a predetermined deactivation temperature, such as, but not limited, 55° F. It is further contemplated that this feature may be enabled or disabled from either the user interface 40 or the communication interface 41.

Further, the water heater 10 may include a cabinet pressure sensor 66 disposed with cabinet 12 and configured to measure the pressure within the interior 24 of the cabinet 12. The controller 38 is in communication with the cabinet temperature sensor 66 and receives the measured cabinet pressure from the cabinet pressure sensor 66. Via communication with the controller 38, the user interface 40 is able to show the measured cabinet pressure to the user via a display 52. The controller 38 may also provide the measured cabinet pressure to the communication interface 41.

In embodiments of the invention including the cabinet pressure sensor 66, the controller 38 may disable or enable the heating function of the heating elements 48 in response to the measured cabinet pressure. For example, the controller 38 may disable the heating elements 48 when the measured cabinet pressure is below a predetermined deactivation pressure. Conversely, the controller 38 may enable the heating elements 48 when the measured cabinet pressure is above a predetermined activation pressure. The predetermined deactivation pressure and predetermined activation pressure may be adjusted by the user at the user interface 40 or the communication interface 41.

Referring again to FIGS. 1-3, the cabinet 12 includes a power opening 68 disposed in one of the sidewalls 16, 18, 20, 22 of the cabinet 12. The representative embodiment of the invention depicts the power opening 68 disposed in the top sidewall 22 of the cabinet 12. The power opening 68 is configured to receive a power connection or wire harness 106. The power connection 106 is electrically coupled to a power distribution block 70 within the cabinet 12. In turn, the power distribution block 70 distributes power to the above described elements within the water heater 10.

The controller 38 is also able to determine the electrical power supplied throughout the water heater 10 via the power connection 106. For example, the controller 38 is able to measure the current traveling through the heating elements 48 to determine the condition of the electrical power supplied throughout the water heater 10. In turn, the controller 38 is able to detect a power down condition in which the water heater 10 is powered down. Similarly, the controller 38 is able to detect a brown out condition within the water heater 10 due to a drop in voltage. Additionally, the controller 38 is able to detect a remote reset condition of the water heater 10, in which the water heater 10 and its systems are reset. Since the controller 38 is in communication with the user interface 40 and the communication interface 41, the controller is able to report the power down condition, brown out condition, the remote reset condition, and the state of all onboard power supplies to the user interface 10 and the communication interface 41. The user interface 40 is then able to display such conditions to the user via the display 52.

In varying embodiments of the invention, it is contemplated that the water heater 10 may include a global positioning system (GPS) 72 disposed within the cabinet. In such instances, the controller 38 may communicate with the GPS 72 to provide the GPS coordinates of the water heater 10 to the user interface 40 and the communication interface 41.

Figure 5:
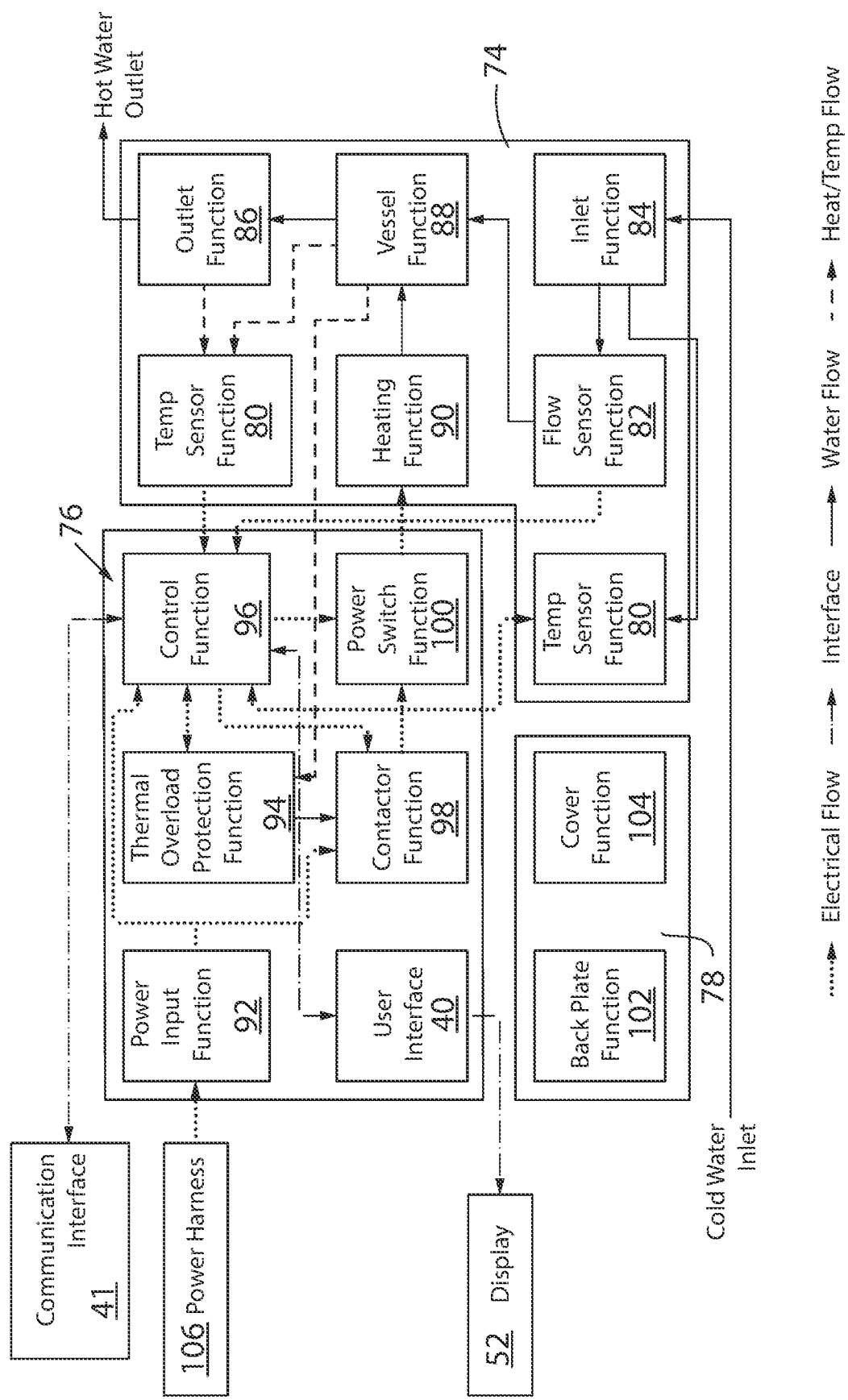
FIG. 5 is a schematic of the water heater of FIG. 1.

Referring now to FIG. 5, a schematic of the water heater 10 divides the above described elements of the water heater 10 into a number of systems. For instance, the water heater 10 includes a plumbing system 74, an electrical system 76, and an enclosure system 78. The plumbing system 74 incorporates multiple functions including, but not limited to, a temperature sensor function 80, a flow sensor function 82, an inlet function 84, an outlet function 86, a vessel function 88, and a heating function 90. The electrical system 76 also includes a number of functions including, but not limited to, a power input function 92, a thermal overload protection function 94, a control function 96 such as controller 38, a contactor function 98, a power switch function 100, and the user interface 40. Meanwhile, the enclosure system 78 includes a back plate function 102 in the form of the back plate 14 to mount the water heater 10 to the wall and a cover function 104 in the form of the cover 26 and the cabinet 12 to enclose the interior 24 of the water heater 10.

The temperature sensor function 80 includes the previously discussed inlet temperature sensor 34, outlet temperature sensor 36, and intermediate temperature sensors 50. As discussed above, the control function 38 monitors the measured temperatures of the temperature sensors 34, 36, 50 of the temperature sensor function 80.

The flow sensor function 82 includes the previously discussed flow sensor 54. As described above, the flow sensor 54 detects both the direction and flow rate of the water flowing through the flow path 28 within the plumbing system 74.

The inlet function 84 is disposed at the inlet 30 of the cabinet 12 and connects the flow path 28 of the plumbing system 74 to a water source (not shown). In addition, the inlet function 84 may also direct water from the water source to the power switch function 100 to cool a heat sink of the power switch function 100. For example, as shown in FIG. 3, the solid-state relays 60 are disposed adjacent the inlet channel 29. As a result, the colder water in the inlet channel 29 assists in cooling the solid-state relays 60. The inlet temperature sensor 34 of the temperature sensor function 80 is included within the inlet function 84.

The outlet function 86 is disposed at the outlet 32 of the cabinet 12 and connects the flow path 28 of the plumbing system 74 to an external plumbing hardware (not shown) to deliver the water heated by the water heater 10. Such external plumbing hardware may include a tepid valve. The outlet temperature sensor 36 of the temperature sensor function 80 is included within the outlet function 86.

The vessel function 88 includes the flow path 28, while the heating function 90 includes the heating elements 48 disposed along the flow path 28. As such, the heating of the water traveling through the flow path 28 occurs within the vessel function 88 and by the heating elements 48 of the heating function 90.

As previously discussed, the user interface 40 allows a user/operator to adjust various parameters of the water heater 10, such as set point temperatures, activation flow rates, etc. The user interface 40 also provides operating information to the user/operator such as temperatures, flow rates, error signals, etc.

The power input function 92 accepts the power connection 106 and distributes the power therefrom to the controller 38 and contactors 58 of the contactor function 98 through electrical circuit protection and step-down transformers.

The thermal overload protection function 94 monitors whether the bimetal thermal switches 56 are open or closed due to a thermal overload. The thermal overload protection function 94 works with the controller 38 to enable the contactor function 98 under normal operating conditions, while disabling the contactor function 98 when a thermal overload condition is detected at the vessel function 88. That is, the contactor function 98 connects the power input function 92 to the power switch function 100 based on the state of the thermal overload protection function 94 while under the command of the controller 38. As a result, the thermal overload protection function 94 provides another means of protection when the controller 38 can no longer control the heating elements 48 properly.

The power switch function 100 controls the electrical energy being provided to the heating elements 48. In the representative embodiment of the invention, the power switch function 100 includes the above described solid-state relays 60. The controller 38 determines the amount of electrical energy provided by the power switch function 100 to the heating element 48. The heating elements 48 then convert the electrical energy provided by the power switch function 100 to thermal energy in order to heat the water within the flow path 28.

As described above, the controller 38 manages the user interface 40, the communication interface 41, monitors the thermal overload protection function 94, monitors the temperature sensor function 80, monitors the flow sensor function 82, controls the contactor function 98, and controls the power switch function 100. The controller 38 determines the amount of electrical energy provided by the power switch function 100 based on the data received by the temperature sensor function 80 and the flow sensor function 82.

Figure 6:
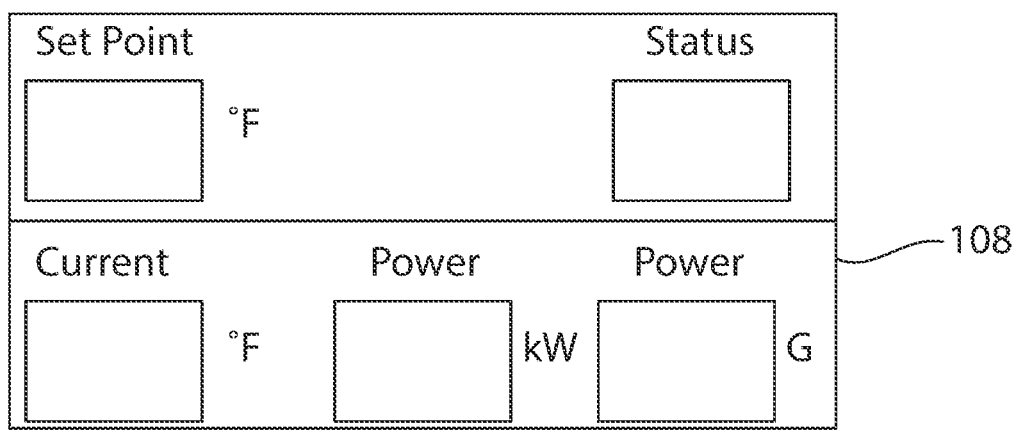

As previously discussed, the user interface 40 includes a display 52 that is configured to display statistics of the water heater 10 to a user. The display 52 is able to cycle through a number of screens. FIGS. 6-14 illustrate various screens of the display 52. As shown in FIG. 6, a main screen 108 displays the set point water temperature. The set point water temperature may be displayed in units such as degrees Fahrenheit and degrees Celsius. As stated above, the user would be able to adjust the set point water temperature via inputs 53 on the user interface 40. Further yet, it is contemplated that the user would be able to adjust the units of the set point water temperature via the inputs 53. The main screen 108 may also display the outlet temperature measured by the outlet temperature sensor 36. The outlet water temperature may be displayed in units such as degrees Fahrenheit and degrees Celsius. The main screen 108 may also display the water flow rate measured by the flow rate sensor 54. The water flow rate may be displayed in units such as gallons per minute (GPM), liters per minute (LPM), or liters per second (LPS). Finally, the main screen 108 may also display the power delivered to the water by way of the heating elements 48. While FIG. 6 illustrates the power being displayed in kilowatts, other embodiments of the invention may use other units of measurement.

In the representative embodiment of the invention, the inputs 53 are in the form of a four-button keypad. In other embodiments of the invention, the inputs 53 may be in the form of a keypad having any number of buttons. In yet other embodiments of the invention, the display 52 may be in the form of a touch screen with the inputs 53 integrated into the display 52.

Figure 7:
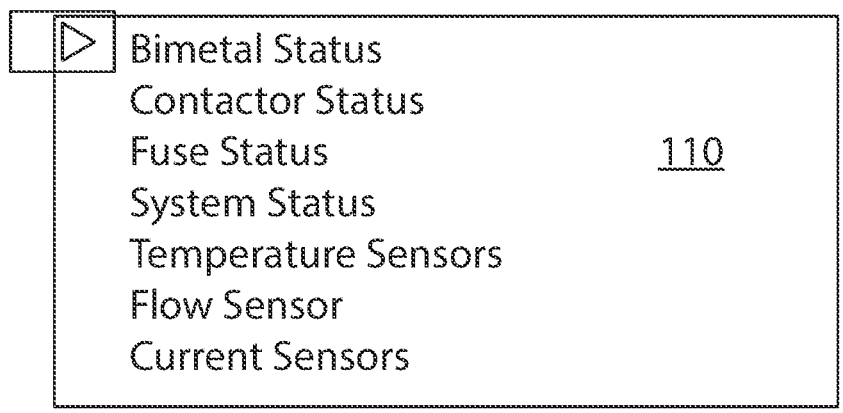

In the representative embodiment of the invention, the display 52 may be changed from the main screen 108 to other display screens. A menu screen 110 may be used to navigate the display 52 through the number of display screens. As shown in FIG. 7, the menu screen may list a menu of elements within the water heater 10 (e.g., Bimetal Status, Contactor Status, Fuse Status, System Status, Temperature Sensors, Flow Sensor, Current Sensors, etc.). The user uses the inputs 53 to navigate the menu and select which display screen the user would like to proceed to in order to analyze the status of specific elements of the water heater 10. As such, the user is able to transition between the main screen and the screens described below via the inputs 53 of the user interface 40.

Figure 8:
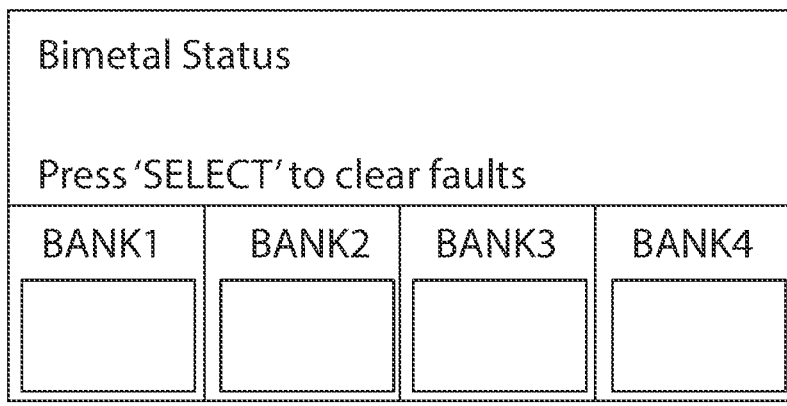

For instance, the user may select "Bimetal Status" to proceed to a bimetal status screen 112. As shown in FIG. 8, the bimetal status screen 112 is configured to illustrate the status of each bank of bimetal thermal switches 56 (e.g., Bank 1, Bank 2, Bank 3, Bank 4, etc.). Each status is configured to indicate whether that specific bank of bimetal thermal switches 56 is functioning normally, in a fault condition, or not active.

Figure 9:
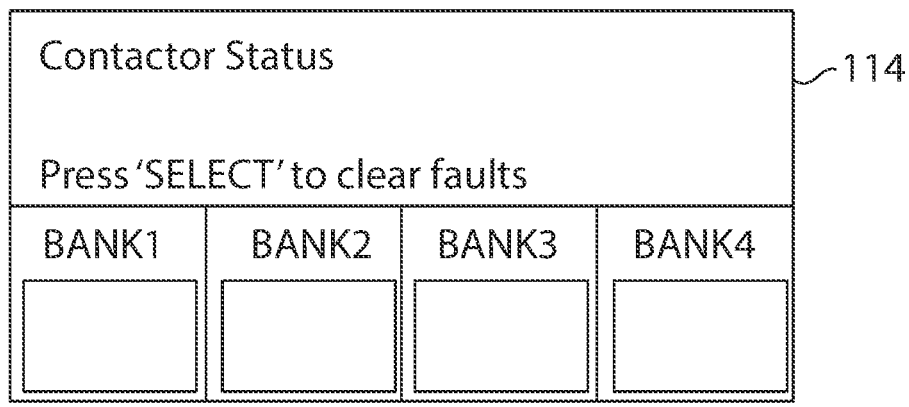

Similarly, the user may select "Contactor Status" to proceed to a contactor status screen 114, which is shown in FIG. 9. In the representative embodiment of the invention, the contactor status screen 114 is configured to show the status of each bank of contactor 58 (e.g., Bank 1, Bank 2, Bank 3, Bank 4, etc.). Each status is configured to indicate whether the specific bank of contactors 58 is functioning normally or not active.

Figure 10:
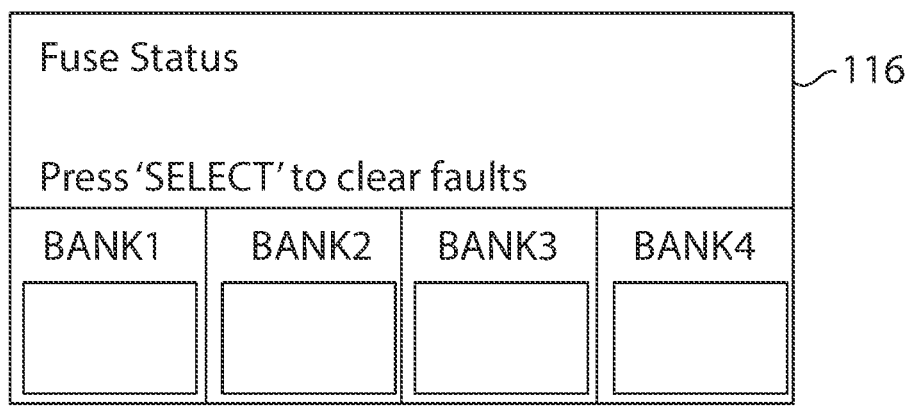

Upon selection of "Fuse Status", the display 52 proceeds to a fuse status screen 116. As shown in FIG. 10, the fuse status screen 116 depicts the status of each bank of fuses 57 (e.g., Bank 1, Bank 2, Bank 3, Bank 4, etc.). Each status depicts whether the specific bank of fuses 57 is functioning normally or in a fault condition.

Figure 11:
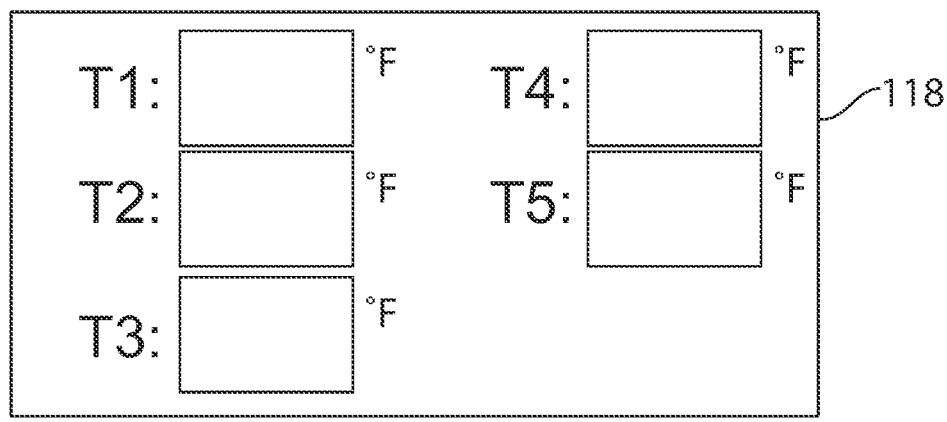

Selection of "Temperature Sensors" from the menu screen 110 transitions the display 52 to the temperature sensor screen 118 shown in FIG. 11. The temperature sensor screen 118 is configured to show the measured temperatures from the input temperature sensor 34, the output temperature sensor 36, and each of the intermediate temperature sensors 50 (e.g., T1, T2, T3, T4, T5, etc.). While FIG. 11 depicts the measured temperatures as being shown in degrees Fahrenheit, it is contemplated that the user can adjust the units of the measured temperatures between degrees Fahrenheit and Celsius.

Figure 12:
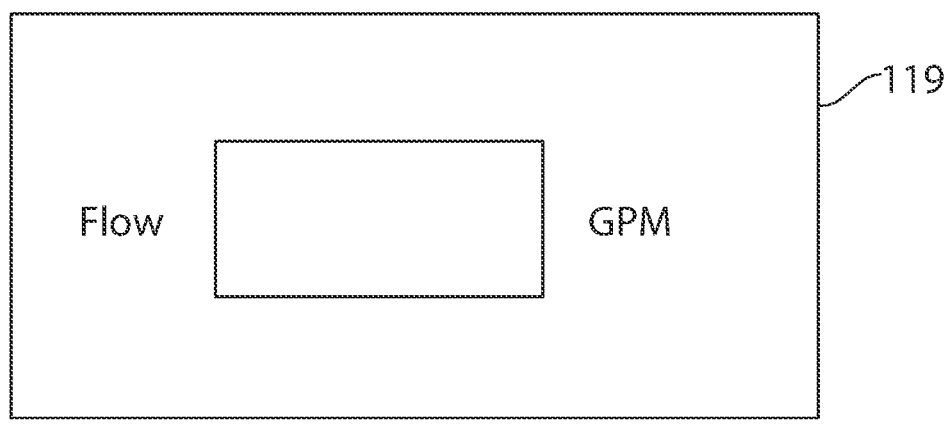

Upon selection of "Flow Sensor" from the menu screen 110, the display 52 transitions to the flow sensor screen 119 shown in FIG. 12. The flow sensor screen 119 is configured to show the measured flow rate of the fluid through the flow rate sensor 54 (e.g., Flow). While FIG. 12 depicts the measured flow rate as being shown in gallons per minute, it is contemplated that the user can adjust the units of the measured flow rate between a number of units, such as, but not limited to, gallons per second, liters per minute, or liters per second.

The user may select "System Information" from the menu screen 110 to transition the display 52 to the system information screen 120. As shown in FIG. 13, the system information screen 120 includes information regarding the water heater 10. Such information includes the model, serial number, and manufacturing information of the water heater 10.

Finally, the user may select "Current Sensors" to transition the display to the current sensor status screen 122, which is shown in FIG. 14. In the representative embodiment of the invention, the current sensor status screen 122 depicts the current being drawn by each bank of heating elements 48 (e.g., Bank 1, Bank 2, Bank 3, Bank 4, etc.).

Other screen alternatives a screen that displays the inlet temperature measured by the inlet temperature sensor 34, the intermediate temperatures measured by the intermediate temperature sensors 50, and the outlet temperature measured by the outlet temperature sensor 36. The temperatures may be displayed in units such as degrees Fahrenheit and degrees Celsius. Such a screen could also display the status of the bimetal thermal switches 56 and allow a user to clear the fault condition of any bimetal fuse 56.

The display 52 may also be configured to display another screen in which a user is able to toggle the water heater 10 between a test mode and a normal operating mode. Features of the test mode will be described in further detail below. In the test mode, the controller 38 allows each contactor 58 to be engaged or disengaged from the user interface 40 or the communication interface 41. Further, the controller 38 allows each bimetal fuse 56 to be set to a fault state from the user interface 40 or the communication interface 41 during the test mode.

In addition, it is contemplated that the controller 38 may include a real-time clock/calendar (RTCC) having time and calendar values. The time and calendar values are communicated to the user interface 40 and the communication interface 41. In addition, the time and calendar values may be modified by the user interface 40 and the communication interface 41.

Further, the controller 38 may be programmed with a means for locking out a user from the user interface 40 in order to prevent an on-site user from unintentionally modifying the settings of the water heater 10. The controller 38 then includes a means for reactivating the user interface 40 for use by a user. For instance, a user password may be entered into the inputs 43 of the user interface 40 to toggle the controller 38 between locking out the user interface 40 and unlocking the user interface 40.

The controller 38 provides the means to control the outlet water temperature by preferably employing a Feed-forward plus proportional, integral, and derivative (PID) control, PID control, and linear quadratic tracking (LQT) to accurately control the outlet water temperature. As discussed above, the controller 38 utilizes feedback from the inlet temperature sensor 34, the intermediate temperature sensors 50, the outlet temperature sensor 36, and the flow sensor or flow meter 54 as part of its means to control the outlet water temperature and align it with the set point temperature. As described above, the controller 38 monitors the status of the contactors 58 and bimetal thermal switches 56. In addition, the controller 38 monitors the current draw of the heating elements 48.

Figure 15:
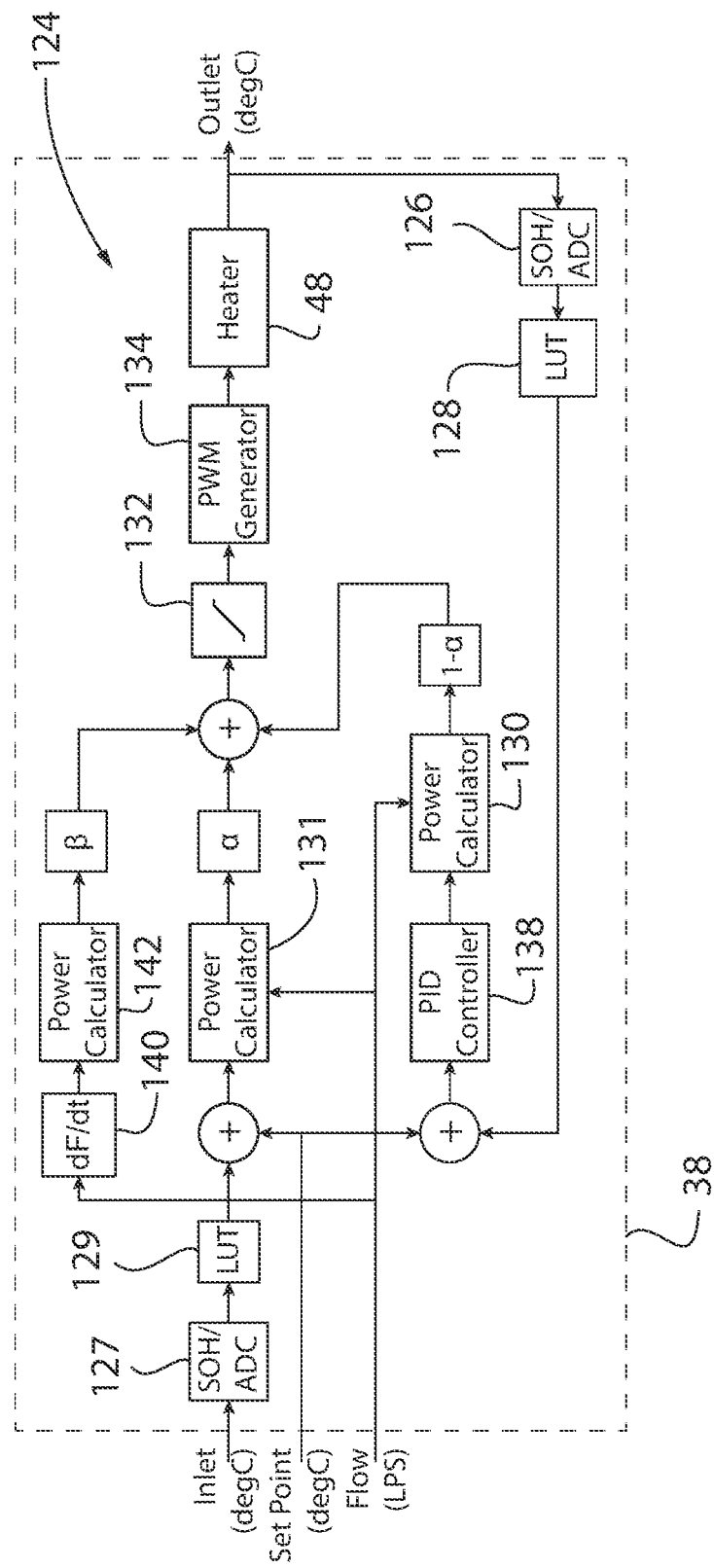
FIG. 15 is a block diagram of a controller of the water heater of FIG. 1.

FIG. 15 is a block diagram depicting the Feed-forward PID control loop 124 of the controller 38, according to an embodiment of the invention. As discussed above, the set point temperature is the desired outlet temperature for the water heater 10. Meanwhile, the actual outlet temperature is measured by the outlet temperature sensor 36. As shown in FIG. 15, the outlet temperature sensor 36 may be configured to output a voltage that a Single Order Hold with Analog-to-Digital Converter (SOH/ADC) 126 is able to quantize. In turn, the output of the SOH/ADC 126 indexes a look up table (LUT) 128 that translates the voltage into a measurement of the outlet temperature in degrees Celsius. Similarly, the inlet temperature sensor 34 may also be configured to output a voltage that a Single Order Hold with Analog-to-Digital Converter (SOH/ADC) 127 is able to quantize. In turn, the output of the SOH/ADC 127 indexes a look up table (LUT) 129 that translates the voltage into a measurement of the outlet temperature in degrees Celsius.

The controller 38 then takes the outlet temperature measurement and subtracts it from the setpoint temperature to create an error measurement. In turn, a PID controller 138 calculates a compensating temperature value based on the error measurement. The compensating temperature value is then fed to a power calculator 130 to determine a power calculation. The power calculation takes into account the flow rate measured by the flow rate sensor 54. The controller 38 may be a computer, chip, PLC, etc.

Likewise, the controller 38 compares the inlet temperature measurement to the setpoint temperature in order to create a compensating temperature reflective of the difference between the inlet temperature and the set point temperature. The compensating temperature value is then fed to a power calculator 131 to determine a power calculation, which also takes into account the flow rate measured by the flow rate sensor 54.

The controller 38 determines the flow measurement as a function of time at block 140. This value is then fed to a power calculator 142 to determine another power calculation. While power calculators 130, 131, 142 above are described as separate features, it is contemplated that a single power calculator within the controller 38 may perform all the tasks of each power calculator 130, 131, 142 discussed above.

In turn, each power calculation is then sent through a limiter 132 that keeps the range of power levels within the capability of the water heater 10 and its heating elements 48. The limited power level determined by the limiter 132 is then sent to a Pulse Width Modulator (PWM) Generator 134, which applies the necessary power to the heating elements 48 in order to align the outlet temperature with the setpoint temperature. The timing of the control loop 124 of the controller 38 may be any value established by a user, preferably 250 ms.

In addition to the PID control loop 124 of the controller 38 described above, the controller 38 further determines the state of the heating elements 48 based on the water flowing through the heater. Once the flow rate sensor 54 exceeds the predetermined activation level previously discussed, the controller 38 transitions from an "idle" state to a "rising temperature" state, in which the heating elements 48 are activated. Once the error measurement between the outlet temperature measurement and the setpoint temperature is within a certain range, the controller 38 transitions to an "at temperature" state. A preferred example of such a range is ±0.5° C. Upon reduction of the measured flow rate from the flow rate sensor 54, the controller 38, which would cause the outlet temperature to overshoot the setpoint temperature, the controller 38 transitions to an "overshoot" state. In the "overshoot" state, the controller 38 turns off the solid-state relays 60 to remove power from the heating elements 48. Once the solid-state relays 60 are turned off, the controller 38 transitions to a "cool down" state and eventually returns to the "idle" state.

The water heater may include three operational modes with increasing maximum set point temperatures. In a tepid safety heater mode, the maximum set point temperature is 95° F. In a temperate heater mode, the maximum set point temperature is 120° F. In a process heater mode, the maximum set point temperature is 160° F. Preferably, these operational modes are determined at the hardware level and are not adjustable from the user interface 42 or communication interface 41.

It is also contemplated that the water heater 10 may be synchronized with any number of other similar water heaters 10 in a back-to-back setup. In such instances, the controllers 38 of each heater 10 may identify which heater 10 is the master unit and which heater 10 is the slave unit.

It is specifically intended that the present invention not be limited to the embodiments and illustrations contained herein, but includes modified forms of those embodiments including portions of the embodiments and combinations of elements of different embodiments as come within the scope of the following claims.

What is claimed is:

1. A water heater comprising:
   a cabinet having an inlet and an outlet;
   a flow path fluidically coupling the inlet and the outlet, the flow path having a plurality of upper junctions and lower junctions to direct the flow path;
   at least one flow rate sensor disposed along the flow path;
   at least one inlet temperature sensor disposed along the flow path adjacent the inlet to measure an inlet temperature;
   at least one outlet temperature sensor disposed along the flow path adjacent the outlet to measure an outlet temperature;

at least one pair of heating elements disposed within the flow path between the inlet and outlet temperature sensors;

plural intermediate temperature sensors configured to measure a respective intermediate temperature at a respective location along the flow path, the plural intermediate temperature sensors being disposed on each of the plurality of upper junctions, each of the plurality of lower junctions, or a combination thereof, and the plural intermediate temperature sensors are disposed between the at least one pair of heating elements;

at least one drain port disposed at the lower junction;

a controller configured to operate the at least one pair of heating elements to heat a fluid within the flow path to a predetermined set point temperature, the controller enabling the at least one pair of heating elements when the at least one flow rate sensor measures a flow rate greater than a predetermined activation flow rate, and disabling the at least one pair of heating elements when the at least one of flow sensor measures a flow rate less than a predetermined deactivation flow rate; and a user interface including a screen, the user interface configured to allow the user to adjust the predetermined activation flow rate and the predetermined deactivation flow rate.

2. The water heater of claim 1 wherein the controller is configured to detect at least one of a power down condition, a brown out condition, and a remote reset condition; and wherein the controller is configured to communicate the at least one of the power down condition, the brown out condition, and the remote reset condition to at least one of the user interface and a communication interface.

3. The water heater of claim 1 wherein the user interface is configured to allow the user to adjust the predetermined set point temperature.

4. The water heater of claim 1 wherein the controller is configured to operate the at least one pair of heating elements based on the inlet temperature, the outlet temperature, and the intermediate temperature.

5. The water heater of claim 4 wherein the controller is configured to communicate the inlet temperature, the outlet temperature, and the intermediate temperature to at least one of the user interface and a communication interface.

6. The water heater of claim 1 further comprising a plurality of channels extending between respective upper and lower junction and a plurality of bimetal thermal switches disposed in at least one of the plurality of channels.

7. The water heater of claim 1 wherein the controller is configured to measure an error value between the set point temperature and the outlet temperature and operate the at least one pair of heating elements to reduce the error value.

8. The water heater of claim 1 further comprising a cabinet heater disposed within the cabinet to maintain an internal cabinet temperature.

9. The water heater of claim 1 further comprising a pressure sensor disposed within the cabinet to measure a cabinet pressure within the cabinet.

10. The water heater of claim 9 wherein the controller is configured to disable the at least one pair of heating elements when the cabinet pressure is below a predetermined pressure deactivation threshold and allows activation of the at least one pair of heating elements when the cabinet pressure is above a predetermined pressure activation threshold.

11. The water heater of claim 10 wherein the controller is configured to communicate the cabinet pressure to the user interface; and wherein the user interface is configured to allow the user to adjust the predetermined pressure activation threshold and the predetermined pressure deactivation threshold.

12. The water heater of claim 1 further comprising a cabinet temperature sensor disposed within the cabinet to measure a cabinet temperature within the cabinet.

13. The water heater of claim 12 wherein the controller is configured to disable the at least one pair of heating elements when the cabinet temperature is below a predetermined temperature deactivation threshold and allows activation of the at least one pair of heating elements when the cabinet temperature is above a predetermined temperature activation threshold.

14. The water heater of claim 1 wherein the at least one flow rate sensor determines a direction of the fluid within the flow path;

wherein a forward flow from the inlet to the outlet is a positive value; and wherein a reverse flow from the outlet to the inlet is a negative value.

15. The water heater of claim 1 wherein the controller is configured to measure current going through the at least one pair of heating elements.

16. The water heater of claim 1 wherein the controller is further configured to disable the at least one pair of heating elements when the at least one of flow sensor measure a zero flow rate or a reverse flow rate.

17. The water heater of claim 1 wherein the user interface includes a display to display information to the user and configured to cycle through a plurality of screens.

18. The water heater of claim 1 wherein the controller may operate the water heater in one of a tepid safety heater mode, a temperate heater mode, or a process heater mode.

19. A water heater comprising:

a cabinet having an inlet and an outlet;

a flow path fluidically coupling the inlet and the outlet, the flow path having a plurality of upper junctions and lower junctions to direct the flow path;

at least one flow rate sensor disposed along the flow path;

at least one inlet temperature sensor disposed along the flow path adjacent the inlet to measure an inlet temperature;

at least one outlet temperature sensor disposed along the flow path adjacent the outlet to measure an outlet temperature;

at least one pair of heating elements disposed within the flow path between the inlet and outlet temperature sensors;

plural intermediate temperature sensors configured to measure a respective intermediate temperature at a respective location along the flow path, the plural intermediate temperature sensors being disposed on each of the plurality of upper junctions, each of the plurality of lower junctions, or a combination thereof, and the plural intermediate temperature sensors are disposed between the at least one pair of heating elements;

at least one drain port disposed at the lower junction;

a controller configured to operate the at least one pair of heating elements to heat a fluid within the flow path to a predetermined set point temperature, the controller enabling the at least one pair of heating elements when the at least one flow rate sensor measures a flow rate greater than a predetermined activation flow rate, and disabling the at least one pair of heating elements when the at least one of flow sensor measures a flow rate less than a predetermined deactivation flow rate;

a user interface configured to allow the user to adjust the predetermined activation flow rate and the predetermined deactivation flow rate, the user interface including a display having a plurality of screens to display information to a user, the plurality of screens comprising:

a first screen of the plurality of screens displaying at least one of a setpoint temperature, the flow rate, and the outlet temperature;

a second screen of the plurality of screens displaying at least one of the inlet temperature, each intermediate temperature, and the outlet temperature; and a third screen of the plurality of screens configured to allow a user to toggle between an operation mode and a test mode; and a communication interface external of the cabinet and in communication with the controller via of a Modbus communication protocol.

* * * * *